United States Patent [19]

Glaab

[11] Patent Number: 5,109,441
[45] Date of Patent: Apr. 28, 1992

[54] FIBER OPTIC EXTERNAL MODULATOR

[75] Inventor: Joseph B. Glaab, New Hope, Pa.

[73] Assignee: General Instrument Corporation, Hatboro, Pa.

[21] Appl. No.: 642,821

[22] Filed: Jan. 18, 1991

[51] Int. Cl.$^5$ .............................................. G02B 6/10
[52] U.S. Cl. ............................................ 385/1; 385/3
[58] Field of Search ............... 350/96.11, 96.12, 96.13, 350/96.14

[56] References Cited

U.S. PATENT DOCUMENTS

| | | | |
|---|---|---|---|
| 4,683,448 | 7/1987 | Duchet et al. | 332/7.51 |
| 4,684,207 | 8/1987 | Lawless | 350/96.14 |
| 4,694,276 | 9/1987 | Rastegar | 340/347 AD |
| 4,758,060 | 7/1988 | Jaeger et al. | 350/96.11 |
| 4,763,973 | 8/1988 | Inoue et al. | 350/96.13 |
| 4,763,974 | 8/1988 | Thaniyavarn | 350/96.14 |
| 4,776,657 | 10/1988 | Reeder | 350/96.14 |
| 4,850,667 | 7/1989 | Djupsjöbacka | 350/96.14 |
| 4,878,723 | 11/1989 | Chen et al. | 350/96.14 |
| 4,932,738 | 6/1990 | Haas et al. | 350/96.14 |
| 4,936,644 | 6/1990 | Raskin et al. | 350/96.14 |
| 4,936,645 | 6/1990 | Yoon et al. | 350/96.14 |

OTHER PUBLICATIONS

L. M. Johnson and H. V. Roussell, "Reduction of Intermodulation Distortion in Interferometric Optical Modulators", *Optics Letters*, vol. 13, No. 10, Oct. 1988, pp. 928-930.

*Primary Examiner*—Frank Gonzalez
*Attorney, Agent, or Firm*—Barry R. Lipsitz

[57] ABSTRACT

An improved external optical modulator provides reduced noise and distortion. An optical carrier to be modulated is split into a plurality of portions. A first portion of the carrier is modulated with an information signal. A second portion of the carrier is processed to provide an attenuating signal. The modulated carrier portion is combined with the attenuating signal to provide an attenuated optical carrier having improved apparent percentage modulation. In a preferred embodiment, the first carrier portion comprises a substantially greater amount of optical carrier power than the second carrier portion.

15 Claims, 2 Drawing Sheets

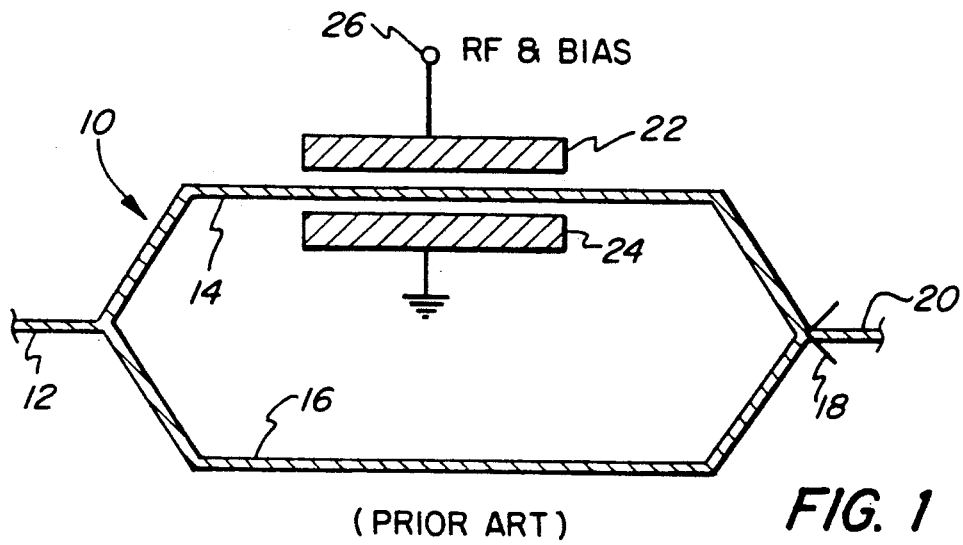
(PRIOR ART) FIG. 1
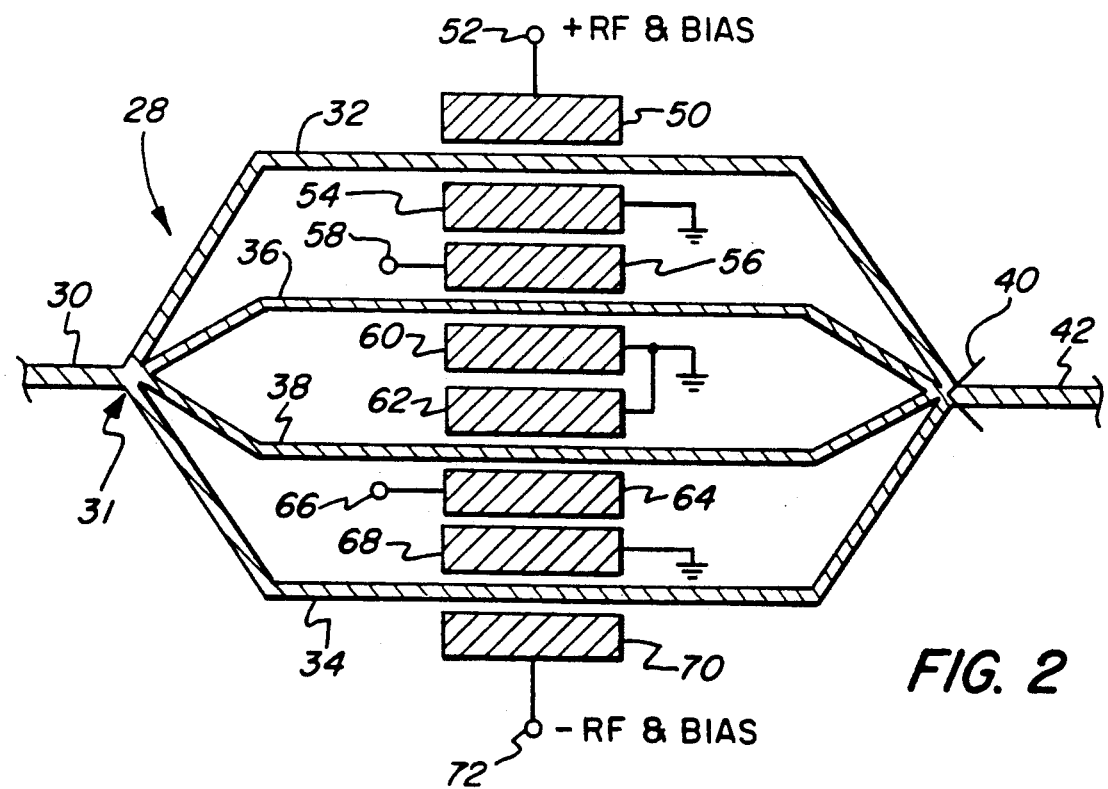
FIG. 2

FIBER OPTIC EXTERNAL MODULATOR

BACKGROUND OF THE INVENTION

The present invention relates to optical modulators, and more specifically to a technique for reducing noise and distortion in the output of an external optical intensity modulator.

Recently, there has been a growing interest in the development of analog, amplitude modulated optical communication systems. In comparison with digital systems, analog communication systems provide an efficient use of bandwidth. This is particularly useful in cable television (CATV) transmission system applications, where it is necessary to transmit a large number of video channels through an optical fiber. Compatibility with existing equipment is achieved by using the same signal format for optical transmission that is in use for coaxial cable signal transmission.

In order to transmit an information signal (e.g., a television signal) over an optical fiber, a light beam ("carrier") must be modulated with the information signal. The "electrooptic effect" has been advantageously used to provide modulators for this purpose. For example, electrooptic modulators using miniature guiding structures are known which operate with a low modulating power.

In electrooptic modulators, the electric field induced linear birefringence in an electrooptic material produces a change in the refractive index of the material which, in turn, impresses a phase modulation upon a light beam propagating through the material. The phase modulation is converted into intensity modulation by the addition of polarizers or optical circuitry. Ideally, an electrooptic modulator should have a linear relationship between its output optical power and the applied modulating voltage.

In a "Mach Zehnder" type electrooptic modulator, an optical carrier (laser beam) is split into two paths. At least one path is electrically phase modulated. The two signals are then recombined in an interferometer to provide an intensity modulated carrier. Typically, lithium niobate (LiNbO$_3$) is used as the electrooptic material. Waveguides in such materials are readily formed by titanium indiffusion.

The output power curve of a Mach Zehnder modulator is nonlinear. Practical analog optical communications systems, however, demand a high linearity. See, for example, W. I. Way, "Subcarrier Multiplexed Lightwave System Design Considerations for Subscriber Loop Applications", *J. Lightwave Technol.*, Vol 7, pp. 1806–1818 (1989). Modulator nonlinearities cause unacceptable harmonic and intermodulation distortions. When it is necessary to communicate a large number of channels, as in a CATV application, intermodulation distortions ("IMD") can impose serious limitations on the system performance. In principle, the second order IMD can be filtered out if the bandwidth is less than one octave. However, CATV transmission systems operate with bandwidths of many octaves. Third order IMD can only be eliminated by using devices with linear characteristics.

Another type of external optical modulator is the acoustooptic modulator. In these devices, the phase grating created by an acoustic wave through the photoelastic effect can either diffract a light beam into many orders as in the Raman-Nath regime of operation or deflect a light beam into a single order as in the Bragg regime. In either regime, intensity modulation of moderate bandwidth is easily accomplished without regard to the polarization of the incident light. At present, the bandwidth of acoustooptic modulators is limited to about a few hundred megahertz by practical considerations of the high frequency transducer design. Guidelines for the selection of acoustooptic materials for device applications are discussed in D. A. Pinnow, "Guidelines for the Selection of Acoustooptic Materials", *IEEE J. Quantum Electron.*, Vol. QE-6, pp. 223–238, Apr. 1970. A review of acoustooptic materials and techniques for light deflection is presented by N. Uchida and N. Niizeki, "Acoustooptic Deflection Materials and Techniques", *Proc. IEEE*, Vol. 61, pp. 1073–1092, Aug. 1973. Acoustooptic modulators also exhibit a nonlinear relationship between output optical power and the applied modulating voltage. As a result, IMD must be reduced to provide practical operation in applications such as cable television transmission.

Typical CATV fiber optic systems using frequency division multiplexed amplitude modulated (AM-FDM) signals will modulate the light output of a laser diode proportionally to the composite AM signal of the cable television FDM spectrum. Lasers with adequate power output and low distortion are expensive and difficult to make. An alternate scheme is to use a high power laser and externally modulate the laser beam. As noted above, known external modulators are nonlinear, although a small linear range of operation is generally available. In order to operate such modulators with low distortion, a high optical carrier input power and small depth of modulation must be used over the limited linear range. When a high power optical signal is output for transmission, the receiving diode yields a large shot noise product. This, coupled with the low modulation percentage, gives a lower than desirable signal to noise ratio in the receiver.

It would be advantageous to provide an external optical modulator that reduces the nonlinear distortion, and particularly second order distortion, of the modulated signal. It would be further advantageous to provide such a modulator that outputs a reduced optical carrier power, to increase the effective modulation of individual carriers and reduce the receiver shot noise. The present invention provides an external optical modulator having the aforementioned advantages.

SUMMARY OF THE INVENTION

In accordance with the present invention, an optical modulator having reduced noise and distortion is provided. An optical carrier is split into a plurality of portions. A first portion of the optical carrier is modulated with an information signal. A second portion of the carrier is processed to provide an attenuating signal. The modulated and processed carrier portions are combined to provide an intensity modulated attenuated optical carrier.

The present invention can be implemented in a balanced Mach Zehnder type modulator wherein the first portion of the optical carrier is modulated in a first path to which the information signal is applied at one polarity. The second portion of the optical carrier is phase shifted in a second path to which a bias signal is applied at said one polarity. A third portion of the optical carrier is modulated in a third path complementary to the first path. The information signal is applied to the third path at a polarity opposite to said one polarity. A fourth portion of the optical carrier is phase shifted in a fourth path complementary to the second path. The bias signal is applied to the fourth path at said opposite polarity.

In the balanced Mach Zehnder modulator embodiment, the combining means can comprise an interferometer coupled to receive the first, second, third and fourth portions of the optical carrier. The splitting means in the balanced Mach Zehnder modulator embodiment can comprise an optical power splitter for providing about one-third of the total optical carrier power to each of the first and third paths, and about one-sixth of the total optical power to each of the second and fourth paths.

BRIEF DESCRIPTION OF THE DRAWINGS

FIG. 1 is a schematic diagram of a prior art Mach Zehnder type external modulator;

FIG. 2 is a schematic diagram of a double balanced Mach Zehnder type modulator with carrier level suppression in accordance with the present invention;

DETAILED DESCRIPTION OF THE INVENTION

Figure 3:
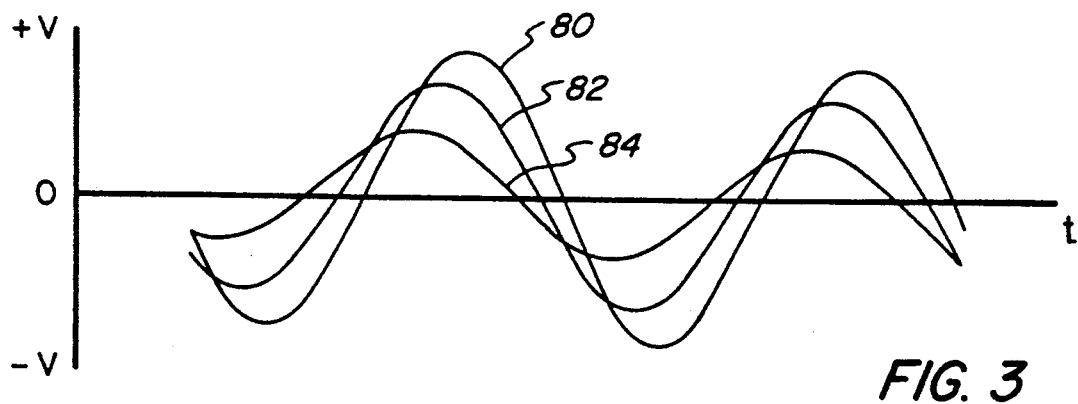
FIG. 3 is a graph showing the output waveforms of a Mach Zehnder modulator of the type shown in FIG. 1.

The present invention provides a method and apparatus for reducing the shot noise effects of an optical modulator and reducing the inherent distortion of signals in an optical AM-FDM communication system.

In a conventional Mach Zehnder modulator such as that generally designated 10 in FIG. 1, a laser beam input to waveguide 12 is split into two paths 14, 16. Path 14 is electrically phase modulated by an input signal (e.g., an RF television signal) applied at terminal 26. The resultant electric field across electrodes 22, 24 produces a change in the refractive index of the waveguide 14, thereby phase modulating the portion of the laser beam propagating therethrough. The phase modulated light is combined with the light traveling through path 16 in an interferometer 18 that adds the signals when they are in phase and subtracts the signals when they are out of phase, producing an intensity modulated signal for output over optical path 20. If the modulating path 14 is biased halfway, a plus/minus linear range can be achieved. Correct biasing can provide a fairly good even order distortion cancellation. However, the linear range over which the modulator operates is small, requiring the power of the input laser beam (optical carrier) to be high and a small depth of modulation to be used. In such a system, shot noise is a problem at the receiver due to the high power of the output signal. The large shot noise product and low modulation percentage together cause the signal to noise ratio at the receiver to suffer.

In accordance with the present invention, an optical modulator is provided that reduces the overall output power as well as the distortion of the phase modulation. A first portion of an optical carrier is modulated with an information signal. A second portion of the carrier is processed to provide an attenuating signal that is combined with the modulated portion of the optical carrier to reduce the amplitude of the carrier with respect to the modulation depth. This results in an intensity modulated attenuated optical carrier that enjoys lower distortion and reduces shot noise at the receiver.

One embodiment of the present invention is illustrated in FIG. 2. A balanced Mach Zehnder modulator 28 receives an optical carrier via path 30 and splits the carrier into four paths 32, 34, 36 and 38. Paths 32, 34 are similar to the conventional Mach Zehnder paths 14, 16 illustrated in FIG. 1. However, both paths 32 and 34 receive the modulating signal via respective electrodes. For path 32, the modulating signal, which can comprise an RF input signal and DC bias, is input at terminal 52. As a result, an electric field is provided across path 32 by electrodes 50, 54. This field modulates the optical carrier portion traveling through path 32.

The portion of the optical carrier passing through path 34 is similarly modulated with an equal but opposite modulating signal input at terminal 72. This provides an electric field across electrodes 68, 70. The structure of Mach Zehnder paths 32, 34 with the accompanying electrodes and modulating signals provides a balanced modulator that operates in an improved push-pull mode. The improvement is demonstrated by comparing the graphs of FIGS. 3 and 4.

FIG. 3 illustrates the output of the conventional Mach Zehnder modulator of FIG. 1. Curve 82 is the nominal carrier passing through the modulator. Curve 80 illustrates the amplitude resulting from a $-45°$ phase shift induced by the modulating signal. Curve 84 illustrates the amplitude resulting from a $+45°$ phase shift induced by the modulating signal. As is clear from FIG. 3, both the amplitude and phase of the carrier are changed by the modulation.

Figure 4:
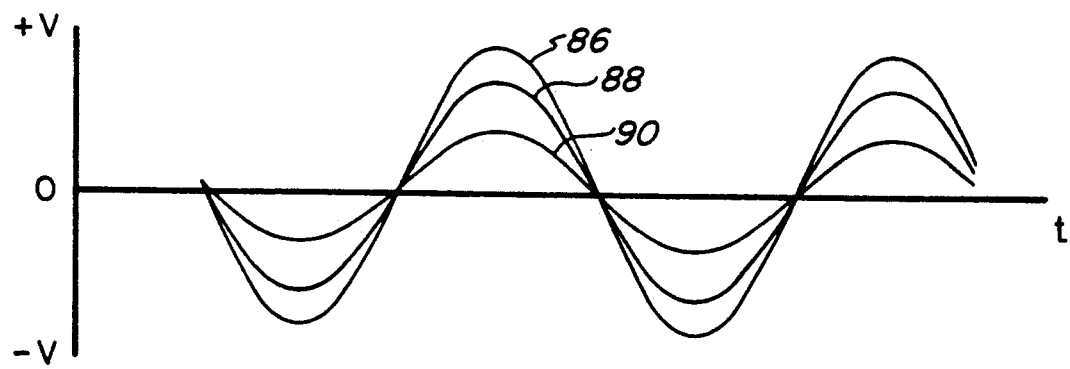
FIG. 4 is a graph showing the output waveforms of a balanced Mach Zehnder modulator without carrier level suppression.

FIG. 4 illustrates the output of a balanced Mach Zehnder modulator wherein both paths are modulated with equal but opposite signals. Curve 88 is the nominal carrier passing through the modulator. Curve 86 illustrates the change in amplitude caused by a $-45°$ phase shift induced by the modulating signal. Curve 90 illustrates the amplitude resulting from a $+45°$ phase shift induced by the modulating signal. As can be seen, the modulating signal in a balanced Mach Zehnder modulator causes the amplitude of the output signal to vary (amplitude modulation) but does not affect the output signal phase.

Turning back to FIG. 2, the structure of the present invention also provides additional paths 36, 38 to provide carrier cancellation in addition to modulation. In path 36, electrooptic phase control of the optical carrier is provided by applying a DC bias signal to terminal 58. The bias signal results in an electric field across electrodes 56, 60. Similarly, the same bias voltage but at opposite polarity is input to terminal 66 for providing an opposite electric field from electrode 62 to electrode 64 across path 38. The DC bias applied to terminals 58 and 66 causes a phase shift in the optical carrier portions passing through paths 36 and 38, respectively. The modulated optical carrier portions from paths 32, 34 are then combined with the DC phase shifted portions of the optical carrier from paths 36, 38 in an interferometer 40 to provide an output signal on path 42 that enjoys an improvement in apparent percentage modulation. This result occurs due to the cancellation of some of the optical carrier power by the phase shifted portions from paths 36, 38. It should be appreciated that although the overall average carrier level is reduced at the output, the instantaneous (i.e., sideband) carrier power is not reduced. By reducing the average carrier level, a higher apparent modulation percentage is achieved.

In a preferred embodiment, splitter 31 is an optical power splitter that provides approximately one-third of the total optical carrier power from path 30 to each of modulation paths 32, 34. The remaining optical power is evenly split between paths 36 and 38, so that each of these paths receives about one-sixth of the total optical carrier power.

Figure 5:
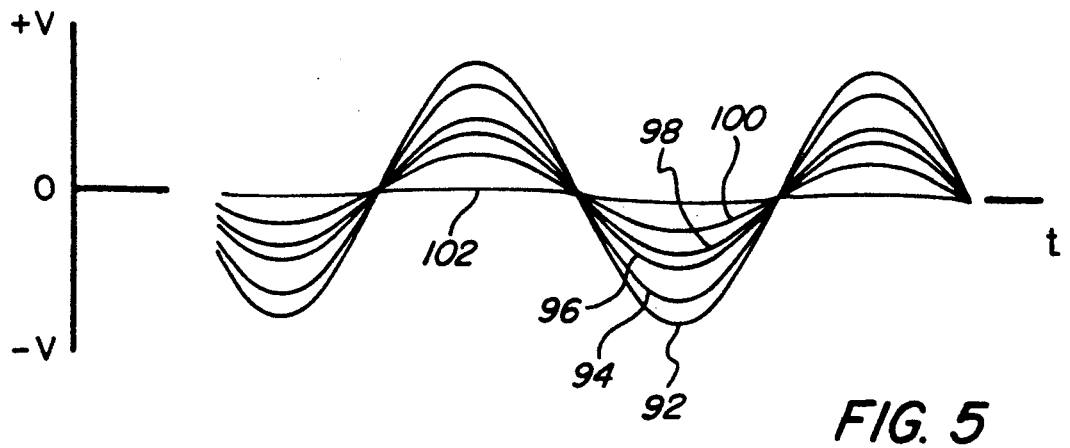
FIG. 5 is a graph showing the output waveforms from an external optical modulator with carrier level suppression in accordance with the present invention.

The resultant output signals are illustrated in FIG. 5. As can be seen, the balanced operation of a modulator in accordance with FIG. 2 does not induce a phase shift between various components of the output signal. Curve 92 illustrates the amplitude of the output signal resulting from a $-45°$ phase shift induced by the modulating signal applied to terminals 52, 72. Curve 94 illustrates the normal amplitude of the optical carrier. Curve 96 illustrates the amplitude of the optical carrier resulting from a $+45°$ phase shift induced by the modulating signal. Curves 92, 94 and 96 are equivalent to curves 86, 88 and 90 of FIG. 4.

The improvement provided by the present invention is illustrated by curves 98, 100 and 102. Curve 100 represents the optical carrier without modulation, but reduced by providing a DC bias voltage at terminals 58, 66 sufficient to shift the phase of the carrier portions passing through paths 36, 38 by $3\pi/4$. The required bias voltage can be determined empirically, for example by tuning the modulator during its operation. Curve 98 represents the amplitude of the reduced carrier when a modulating signal is applied that shifts the phase in modulating paths 32, 34 by $-45°$. Curve 102 represents the amplitude of the reduced carrier when the modulating signal provides a $+45°$ phase shift.

As can be seen by comparing curves 98, 100 and 102, an essentially 100% depth of modulation can be achieved with only $\pm 45°$ of desired modulation phase shift. This is a substantial improvement over prior art optical modulators. The improvement is achieved in a manner which does not create a phase shift of the light with resultant chromatic distortion (dispersion) of the optical output signal. By reducing the absolute carrier level transmitted to the receiver, the shot noise at the receiver is reduced.

The fabrication of the device illustrated in FIG. 2 can be accomplished using conventional techniques well known in the art of electrooptic modulators.

It should now be appreciated that the present invention provides an optical modulator providing an improvement in apparent percentage modulation as a result of the cancellation of some of the light passing through the modulator. This reduces the carrier level, increasing the percentage modulation, while at the same time reducing shot noise induced at a receiver by the modulated carrier. Although the invention has been described in connection with various embodiments, those skilled in the art will appreciate that numerous adaptations and modifications may be made thereto without departing from the spirit and scope of the invention as set forth in the following claims.

What is claimed is:

1. An optical modulator for modulating an optical carrier with an information signal comprising:
   means for splitting an optical carrier received from a first source into a plurality of portions;
   means, coupled to receive a first portion of said optical carrier from said splitting means, for modulating said first portion with an information signal received from a second source;
   means, coupled to receive a second portion of said carrier from said splitting means, for processing said second portion to provide an attenuating signal for use in attenuating said optical carrier; and
   means, coupled to receive said attenuating signal and the modulated first portion of said optical carrier, for combining the modulated first portion with said attenuating signal to provide an intensity modulated attenuated optical carrier.

2. An optical modulator in accordance with claim 1 wherein:
   said first portion of said optical carrier is modulated in a first path of a Mach Zehnder type modulator to which said information signal is applied at one polarity;
   said second portion of said optical carrier is phase shifted in a second path of said modulator to which a bias signal is applied at said one polarity;
   a third portion of said optical carrier is modulated in a third path of said modulator complementary to said first path and to which said information signal is applied at a polarity opposite to said one polarity; and
   a fourth portion of said optical carrier is phase shifted in a fourth path of said modulator complementary to said second path and to which said bias signal is applied at said opposite polarity.

3. An optical modulator in accordance with claim 2 wherein said combining means comprise an interferometer coupled to receive said first, second, third and fourth portions of the optical carrier.

4. An optical modulator in accordance with claim 3 wherein said splitting means comprise an optical power splitter for providing about one-third of the total optical carrier power to each of said first and third paths and about one-sixth of the total optical carrier power to each of said second and fourth paths.

5. An optical modulator in accordance with claim 2 wherein said splitting means comprise an optical power splitter for providing about one-third of the total optical carrier power to each of said first and third paths and about one-sixth of the total optical carrier power to each of said second and fourth paths.

6. An external optical modulator comprising:
   first and second optical paths adapted to receive and carry first equal portions of an optical carrier;
   means operatively associated with said first and second paths for equally and oppositely phase modulating said carrier portions in said first and second paths, respectively;
   third and fourth optical paths adapted to receive and carry second equal portions of said optical carrier;
   biasing means operatively associated with said third and fourth paths for equally and oppositely phase shifting the carrier portions in said third and fourth paths, respectively; and
   means coupled to receive and combine the modulated carrier portions from said first and second paths with the phase shifted carrier portions from said third and fourth paths for providing an intensity modulated output signal.

7. A modulator in accordance with claim 6 wherein said combining means comprise an interferometer coupled to combine the carrier portions from said first, second, third and fourth paths.

8. A modulator in accordance with claim 6 wherein said first equal portoins each comprise about one-third of the power of said optical carrier and said second equal portions each comprise about one-sixth of the power of said optical carrier.

9. A method for externally modulating an optical carrier to communicate an information signal over an optical signal distribution path, comprising the steps of:
   splitting an optical carrier to be modulated into a plurality of portions;
   modulating a first portion of said carrier with an information signal;
   processing a second portion of said carrier to provide an attenuating signal; and
   combining the modulated carrier portion with said attenuating signal to provide an attenuated optical carrier having improved apparent percentage modulation.

10. A method in accordance with claim 9 wherein said first carrier portion comprises a substantially greater amount of optical carrier power than said second carrier portion.

11. A method in accordance with claim 10 wherein said first carrier portion comprises about two-thirds of said optical carrier power and said second carrier portion comprises about one-third of said power.

12. A method in accordance with claim 9 wherein said processing step shifts the phase of said second carrier portion.

13. A method in accordance with claim 12 wherein said phase is shifted by a fixed amount.

14. A method in accordance with claim 9 wherein said processing step reduces the amplitude of said second carrier portion.

15. A method in accordance with claim 14 wherein said amplitude is reduced by a fixed amount.

* * * * *